US 11,594,774 B2

United States Patent
Rieblinger et al.

(10) Patent No.: US 11,594,774 B2
(45) Date of Patent: Feb. 28, 2023

(54) METHOD FOR ASSEMBLING A BATTERY, BATTERY, AND MOTOR VEHICLE HAVING SUCH A BATTERY

(71) Applicant: AUDI AG, Ingolstadt (DE)

(72) Inventors: Martin Rieblinger, Schrobenhausen (DE); Martin Schuessler, Kösching (DE)

(73) Assignee: AUDI AG, Ingolstadt (DE)

( * ) Notice: Subject to any disclaimer, the term of this patent is extended or adjusted under 35 U.S.C. 154(b) by 253 days.

(21) Appl. No.: 16/927,096

(22) Filed: Jul. 13, 2020

(65) Prior Publication Data

US 2021/0020878 A1 Jan. 21, 2021

(30) Foreign Application Priority Data

Jul. 15, 2019 (DE) ...................... 10 2019 210 439.8

(51) Int. Cl.
| | | |
|---|---|---|
| *H01M 50/20* | (2021.01) | |
| *H01M 10/613* | (2014.01) | |
| *H01M 10/625* | (2014.01) | |
| *H01M 10/653* | (2014.01) | |
| *H01M 10/6556* | (2014.01) | |
| *H01M 10/6567* | (2014.01) | |
| *H01M 10/647* | (2014.01) | |

(52) U.S. Cl.
CPC ......... *H01M 50/20* (2021.01); *H01M 10/613* (2015.04); *H01M 10/625* (2015.04); *H01M 10/647* (2015.04); *H01M 10/653* (2015.04); *H01M 10/6556* (2015.04); *H01M 10/6567* (2015.04); *H01M 2220/20* (2013.01)

(58) Field of Classification Search
None
See application file for complete search history.

(56) References Cited

U.S. PATENT DOCUMENTS

| | | | | |
|---|---|---|---|---|
| 2015/0340746 A1* | 11/2015 | Origuchi | ............ | H01M 10/637 |
| | | | | 429/9 |
| 2016/0301117 A1* | 10/2016 | Tyler | ...................... | H01M 50/20 |
| 2017/0346143 A1* | 11/2017 | Deser | .................. | H01M 10/613 |

FOREIGN PATENT DOCUMENTS

| | | |
|---|---|---|
| CN | 106953136 A | 7/2017 |
| DE | 10 2014 226 249 A1 | 6/2016 |
| DE | 10 2015 002 828 A1 | 9/2016 |

(Continued)

OTHER PUBLICATIONS www.espacenet.com machine translation of DE 102018101543A1. (Year: 2019).*

(Continued)

*Primary Examiner* — Gregg Cantelmo
(74) *Attorney, Agent, or Firm* — Maier & Maier, PLLC

(57) ABSTRACT

A method for assembling a battery, wherein the battery has a plurality of battery modules each including multiple battery cells, a battery housing at least partially enclosing the battery modules, and a temperature control unit thermally contacted with the battery housing. A thermally conductive cavity filling compound for thermally contacting the battery cells of the respective battery module with the temperature control unit is arranged in a cavity between an outside of a respective battery module inserted into the battery housing and an inside of the battery housing facing toward the outside of the respective battery module.

11 Claims, 3 Drawing Sheets

(56) References Cited

FOREIGN PATENT DOCUMENTS

| | | |
|---|---|---|
| DE | 10 2017 100 030 A1 | 7/2017 |
| DE | 10 2018 005 234 A1 | 1/2019 |
| DE | 10 2017 213 887 A1 | 2/2019 |
| DE | 102018102989 A1 | 3/2019 |
| DE | 102017223664 A1 | 6/2019 |
| DE | 102018101543 A1 * | 7/2019 |

OTHER PUBLICATIONS

Office Action dated Jun. 22, 2022, in connection with corresponding Chinese Application No. 202010667849.X (21 pp., including machine-generated English translation).

Examination Report dated Feb. 28, 2020 in corresponding German application No. 10 2019 210 439.8; 13 pages including Machine-generated English-language translation.

\* cited by examiner

METHOD FOR ASSEMBLING A BATTERY, BATTERY, AND MOTOR VEHICLE HAVING SUCH A BATTERY

FIELD

The disclosure relates to a method for assembling a battery, a battery, an assembly device for assembling a battery, and a motor vehicle having such a battery.

BACKGROUND

In the assembled state, the battery has a plurality of battery modules each comprising multiple battery cells, a battery housing at least partially enclosing the battery modules, and a temperature control unit which is thermally contacted with the battery housing. In other words, the fully assembled battery comprises the components mentioned. During the assembly, a thermally conductive cavity filling compound for thermal contacting of the battery cells of the respective battery module with the temperature control unit is arranged in a cavity between an outside of a respective battery module inserted into the battery housing and an inside of the battery housing facing toward the outside of the respective battery module.

A battery in the sense of the invention is in particular a high-voltage battery (high voltage: electrical voltage greater than 60 V). Such a battery is preferably used as an electrical energy accumulator for an at least partially electrically driven motor vehicle. In order to be able to provide the electric voltage required to drive the motor vehicle, generally of several hundred volts, the battery comprises a plurality of electrically interconnected battery modules. Such a battery module has multiple battery cells. The battery cells can be designed, for example, as round cells and/or as prismatic cells. The battery module is generally equipped with a mechanical clamping device, which is used to exert a pressure on the battery cells in order to limit a volume enlargement (so-called swelling) occurring in operation of the battery cells. Such a clamping device can be designed as a battery module housing, which encloses the battery cells of the battery module. However, the clamping device can also be designed to be open and have at least two plates which are arranged on opposite sides of the battery module and are connected to one another by means of at least one anchor, in particular by means of at least one threaded rod. A thermally insulating material, in particular a thermally insulating pad with or without air channels, can preferably be arranged between the individual battery cells of the battery module. As a result, the individual battery cells are advantageously thermally insulated from one another.

In order to be able to operate a battery of the type described efficiently, it is necessary to set an operating temperature which, when the battery is in operation, is always within a predetermined, design-dependent temperature range. A temperature control unit is generally used for this purpose. Such a temperature control unit can be arranged, for example, as a temperature control plate on the battery housing and/or can be integrated into the battery housing. A thermally conductive cavity filling compound or a so-called gap filler is generally used to thermally contact the battery cells with the temperature control unit. Alternatively or additionally, a mat-shaped heat-conducting element, for example, can be used.

DE 10 2017 213 887 A1 describes such a heat-conducting element of a battery, which is formed as a formation made up of a plurality of fibers comprising at least one metal. Such a heat-conducting braid has to be provided in a predetermined size corresponding to the battery. Disadvantageously, flexible metering of the heat-conducting medium, as provided, for example, by a viscous or thick heat-conducting cavity filling compound, is not provided here.

DE 10 2015 002 828 A1 also relates to the temperature control, in particular the cooling, of a motor vehicle battery. For this purpose, DE 10 2015 002 828 A1 provides cooling elements arranged between and under individual battery cells and coated with a plastic. Here too, the flexibility of the arrangement is disadvantageously limited.

DE 10 2018 005 234 A1 in turn describes the use of a thermal paste, via which battery cells of a battery are thermally coupled to a cooler for cooling the battery cells. To avoid excessive consumption of thermal paste and/or excessive contact pressure when assembling the battery, DE 10 2018 005 234 A1 provides metering the thermal paste to be applied individually in dependence on a respective height of a battery cell. For this purpose, a respective cell is scanned in a complex method by means of a measuring sensor or by means of a suitable measuring system while the thermal paste is being applied.

DE 10 2014 226 249 A1 also describes a method for producing a battery system using a heat-conducting agent.

SUMMARY

The disclosure is based on the object of providing an efficient method for assembling a battery of the type described at the outset.

A method for assembling a battery of the type described at the outset is provided by the invention. The battery comprises a plurality of battery modules each comprising a plurality of battery cells. In addition, the battery comprises a battery housing at least partially enclosing the battery modules, and a temperature control unit which is thermally contacted with the battery housing. The temperature control unit can be arranged, for example, as a temperature control plate on the battery housing and/or can be integrated into the battery housing. A temperature control medium preferably flows through the temperature control unit. To thermally contact the battery cells of the battery with the temperature control unit, a thermally conductive cavity filling compound is arranged in a cavity between an outside of a respective battery module inserted into the battery housing and an inside of the battery housing facing toward the outside of the respective battery module. In other words, the cavity mentioned is filled up or filled using the thermally conductive cavity filling compound.

The method according to the invention is distinguished in that when the respective battery module is inserted into the battery housing along an insertion direction, the respective battery module and the battery housing are moved in relation to one another in the meantime in at least one further direction and/or in the insertion direction by means of a shaking movement by a motorized shaker. A shaking movement is, in a known manner, a movement having multiple reversals of direction along a movement line. A shaking frequency can be greater than 1 Hz for this purpose. The thermally conductive cavity filling compound is distributed in the cavity by the shaking movement. In other words, there is a predetermined insertion direction along which the respective battery module is inserted into the battery housing. The insertion direction is dependent on the surrounding conditions of the battery assembly locations, but preferably extends along an axis extending along the gravity of the earth, i.e., along the so-called z axis. In this way, gravity can advantageously be used to insert the battery module into the battery housing.

According to the invention, a motorized shaker now exerts a shaking movement in at least one further direction and/or in the insertion direction during the insertion of the respective battery module along the mentioned insertion direction, which has the result that the respective battery module and the battery housing are moved in relation to one another in addition to the actual insertion movement. The shaking movement or oscillation can take place along spatial directions perpendicular or oblique in relation to the mentioned z axis direction. The shaking movement or oscillation can, however, additionally or alternatively take place along the z axis direction or insertion direction. The shaking movement can be translational and/or rotational and/or vertically aligned. The frequency of the shaking movement is preferably adapted to the materials and/or components of the battery to be assembled and/or to rheological properties of the cavity filling compound. In other words, the arrangement or the introduction of the cavity filling compound is combined with a shaking procedure. The thermally conductive cavity filling compound is distributed in the cavity by the shaking procedure or the shaking movement.

Multiple advantages result due to the invention. On the one hand, the distribution of the cavity filling compound in the cavity is assisted by the shaking or the shaking movement, so that a contact pressure when inserting a respective battery module can be reduced. On the other hand, a bubble inclusion in the cavity filling compound is advantageously avoided when the respective battery module is inserted, since the cavity filling compound is distributed in the cavity in an expanding movement that displaces the air outward. In addition, a process time required for assembling the battery can be shortened by the additional distribution of the cavity filling compound. Excessive consumption of cavity filling compound can also advantageously be avoided.

The invention also includes embodiments which result in additional advantages.

One embodiment provides that during the insertion, the respective battery module is at least temporarily moved by means of the shaking movement in relation to the battery housing and the battery housing is held stationary. In other words, the respective battery module is exclusively moved by means of the shaking movement in relation to the battery housing at least temporarily, wherein the battery housing is not moved. The advantage thus results that the battery housing, which is generally larger and heavier than the respective battery module, does not have to be shaken or set into motion in a complex manner.

A further embodiment provides that the battery housing is arranged on a shaking table and is moved by means of the shaking movement during the insertion, wherein the respective battery module is only moved along the insertion direction for the insertion. The advantage thus results, for example, when inserting multiple battery modules at the same time, that they are not inadvertently hit against one another due to a respective shaking movement.

According to one particularly advantageous embodiment, it is provided that a thixotropic fluid is used as the cavity filling compound. Thixotropy refers to the property of a fluid of losing viscosity under the action of a shear force. In other words, a thixotropic fluid becomes more liquid than an initial viscosity state under the action of shear force. If the applied force disappears, the fluid returns to the initial viscosity state. A thixotropic fluid can be used in a particularly advantageous manner for the method according to the invention, since a viscosity of the fluid is reduced by the shaking movement during the insertion of a respective battery module, while after the insertion process has taken place, the respective battery module is fixed within a short time in the fluid which is then again more viscous. A commercially available cavity filling compound can be thixotroped, for example, by adding silica gel.

One embodiment provides that the respective battery module is immersed in or shaken into the cavity filling compound. The immersion can in particular be carried out to a predominant extent. In other words, the cavity filling compound is first introduced into the empty battery housing. This can be carried out by filling or injecting. Immersing the respective battery module results in the advantage that the respective battery module is in contact with the cavity filling compound on several of its outer surfaces.

A further embodiment provides that the cavity filling compound or at least part of it is arranged before the insertion on at least one of the battery cells of the respective battery module and/or on the inside of the battery housing facing toward the outside of the respective battery module. In other words, it is preferably provided that the cavity filling compound is arranged or applied or introduced directly on a respective battery cell and/or in the battery housing. The embodiment described here moreover provides that the cavity filling compound is arranged as at least one strand and/or at least one blob, wherein each strand and/or blob is flattened and/or expanded and/or smeared by the shaking movement A strand or a sausage usually has a rounded cross section. The extension of the strand along a longitudinal extension direction extending perpendicular to the rounded cross-sectional area is multiple times greater here than a radius of the rounded cross-sectional area. Such a strand can also be applied in an undulating manner, so that the undulating application pattern enables a flat, in particular full-area, coverage of a bottom of the battery housing and/or an outer surface of the respective battery cell. A blob can be implemented as a swab or heap or chunk. In contrast to a strand, a blob has no clear longitudinal extension direction. A blob can therefore be applied in a punctiform manner. Intermediate forms between blob and strand are also conceivable. For example, an elongated blob can also be referred to as a shortened strand. The application patterns described result in the advantage that the cavity filling compound can be metered very sparingly.

The invention additionally relates to a battery comprising a plurality of battery modules, a battery housing at least partially enclosing the battery modules, and a temperature control element which is thermally contacted with the battery housing. A respective battery module comprises multiple battery cells here. In the battery according to the invention, a thermally conductive cavity filling compound for thermal contacting of the battery cells of the respective battery module with the temperature control unit is arranged in a cavity between an outside of a respective battery module inserted into the battery housing and an inside of the battery housing facing toward the outside of the respective battery module. The battery according to the invention is characterized in that the battery housing and the respective battery module, when the respective battery module is inserted into the battery housing along an insertion direction, are designed to be moved in relation to one another by means of a shaking movement by a motorized shaker in at least one further direction and/or in the insertion direction. The thermally conductive cavity filling compound is configured to be distributed in the cavity by the shaking movement.

According to one preferred embodiment of the battery, the battery cells are designed as round cells and/or prismatic cells.

The invention furthermore relates to an assembly device for assembling a battery, wherein the assembly device has an assembly space for arranging a battery housing of the battery to be assembled and is configured, during the insertion of the battery module of the battery to be assembled along an insertion direction into the battery housing, to move this module and/or the housing by means of a shaking movement in at least one further direction and/or in the insertion direction by means of a motorized shaker. In other words, the assembly device is configured to move the battery housing and/or the battery module by means of a shaking movement using a motorized shaker. The movement can take place here in at least one further direction and/or in the insertion direction.

The disclosure additionally relates to a motor vehicle having a battery according to the invention.

The motor vehicle according to the invention is preferably designed as an automobile, in particular as a passenger vehicle or truck, or as a passenger bus or motorcycle.

The disclosure also includes refinements of the battery according to the invention and the motor vehicle according to the invention which have features as have already been described in conjunction with the refinements of the method according to the invention. For this reason, the corresponding refinements of the battery according to the invention and the motor vehicle according to the invention are not described again here.

The disclosure also comprises the combinations of the features of the described embodiments.

BRIEF DESCRIPTION OF THE FIGURES

Exemplary embodiments of the invention are described hereafter. In the figures.

DETAILED DESCRIPTION

Figure 1:
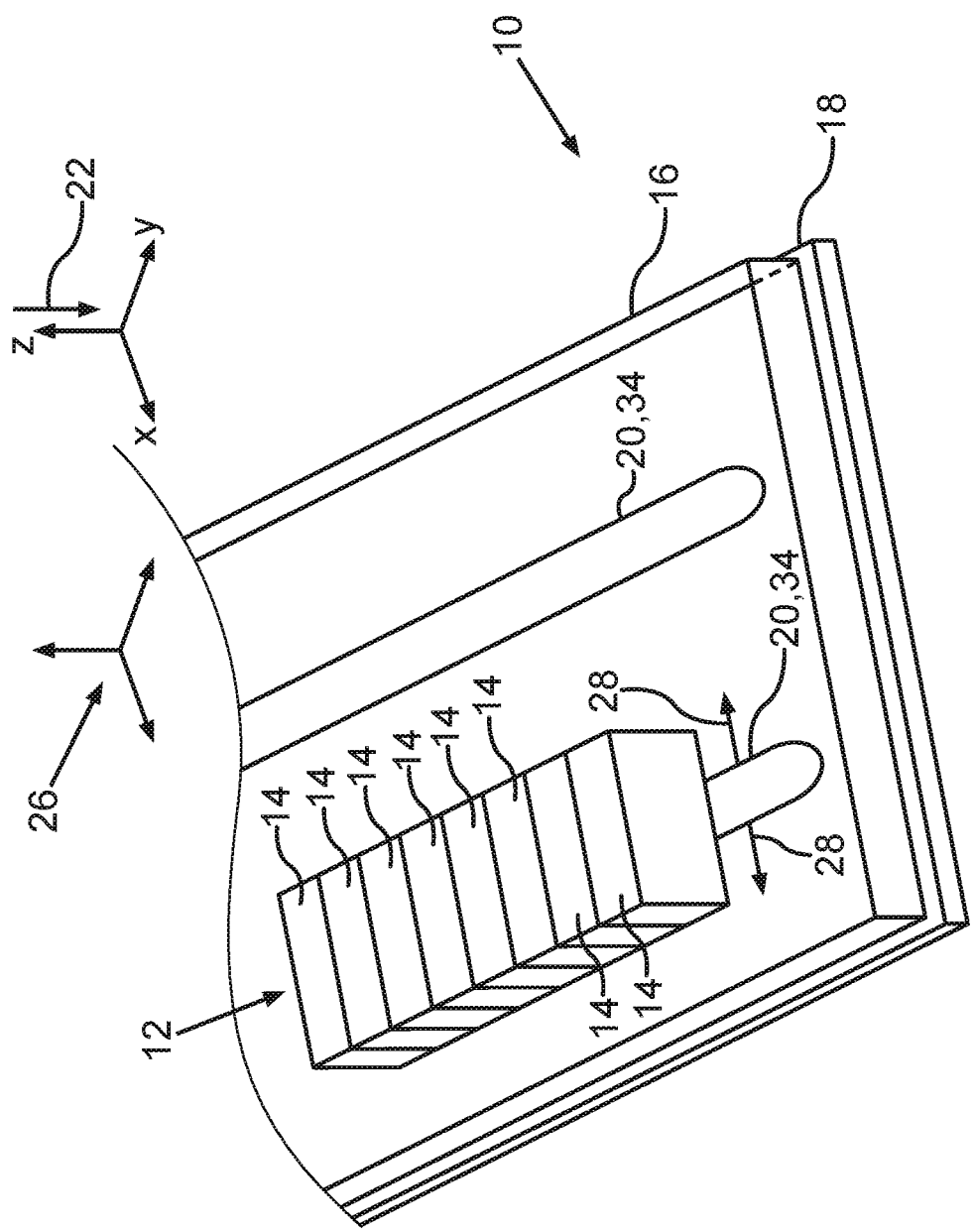
FIG. 1 shows a schematic illustration of a partially assembled battery.

The exemplary embodiments explained hereafter are preferred embodiments of the invention. In the exemplary embodiments, the described components of the embodiments each represent individual features of the invention to be considered independently of one another, which each also refine the invention independently of one another and are thus also to be considered to be parts of the invention individually or in combinations other than those shown. Furthermore, the described embodiments can also be supplemented by further features of the invention that have already been described.

In the figures, the same reference numerals designate elements that have the same function.

FIG. 1 shows a partially assembled battery 10 having a battery module 12, wherein the battery module 12 has a plurality of battery cells 14. The battery 10 additionally has a battery housing 16 which at least partially encloses the battery module 12. In the exemplary embodiment shown in FIG. 1, a temperature control unit 18 in the form of a temperature control plate is arranged on the battery housing 16. The temperature control unit 18 can also be integrated into the battery housing 16. The temperature control unit 18 can have channels and/or ribs (not shown here), through which a temperature control medium preferably flows.

In order to thermally contact the battery cells 14 of the battery module 12 with the temperature control unit 18, a cavity filling compound 20 is arranged between the battery cells 14 and the battery housing 16. In the embodiment shown in FIG. 1, the cavity filling compound 20 is applied in strands 34 to an inside of the battery housing 16. When the battery module 12 is inserted into the battery housing 16, an insertion direction 22 extends along a z axis direction. A shaking movement 26 is exerted by a motorized shaker 24 (not shown in FIG. 1) when the battery module 12 is inserted into the battery housing 16. In the exemplary embodiment shown in FIG. 1, the shaking movement 26 extends in the z direction and x direction and y direction. The thermally conductive cavity filling compound 20 is distributed by the shaking movement 26 at least along the flow front profiles 28 indicated by arrows.

Figure 2:
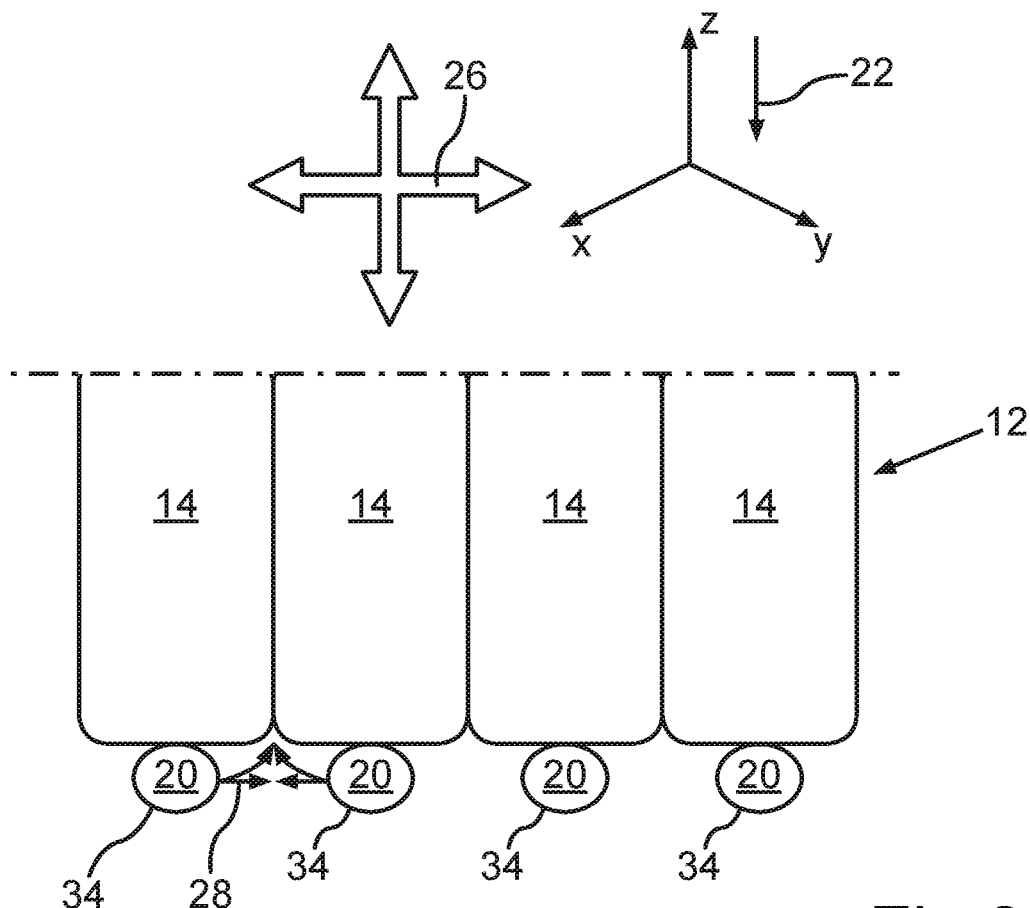
FIG. 2 shows a schematic lateral detail view of multiple battery cells having cavity filling compound assembled to form a battery module.

FIG. 2 shows, with reference to the components described in conjunction with FIG. 1, a lateral detail view of four battery cells 14 of a battery module 12 as an example. A strand 34 of cavity filling compound 20, which is rounded in the cross-sectional view shown here, is arranged on a respective underside of each of the battery cells 14. If the battery module 12 is now inserted along the insertion direction 22 into the battery housing 16 (not shown in FIG. 2), when the shaking movement 26 is executed, a flow front profile 28 of the applied strands 34 occurs, which ensures that the cavity filling compound 20 is distributed not only between the battery cells 14 and the battery housing 16 (not shown in FIG. 2), but rather also is pressed into the gussets between the battery cells 14.

Figure 3:
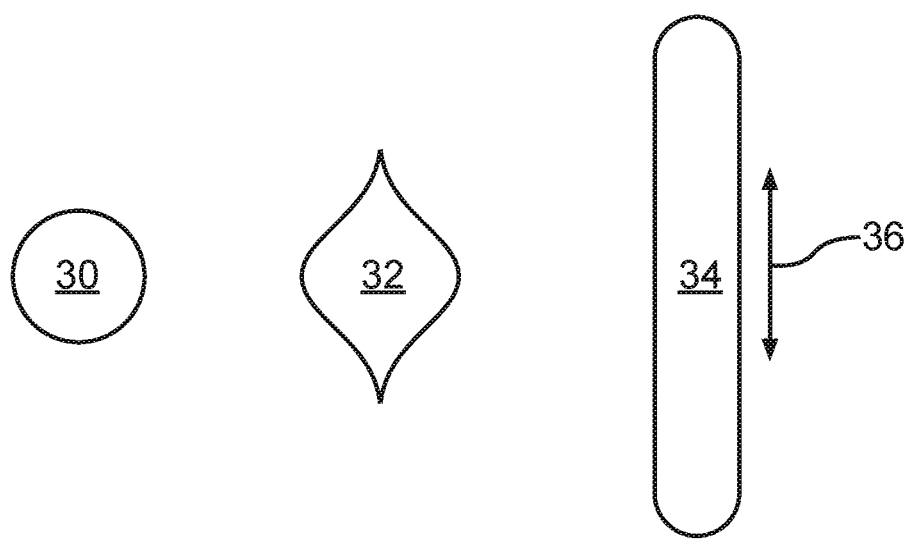
FIG. 3 shows schematic illustrations of possible application patterns of the cavity filling compound.

FIG. 3 shows exemplary application patterns of the cavity filling compound 20. FIG. 3 shows here an exemplary embodiment of a blob 30, an oblong blob 32, and a strand 34. The strand 34 has a clear longitudinal extension direction 36 in this case. The respective application pattern can now advantageously be selected depending on the geometric shape of the battery cells 14 used. For round cells, a blob 30 is therefore preferably suitable as an application pattern, while prismatic cells are preferably provided with a strand 34.

Figure 4:
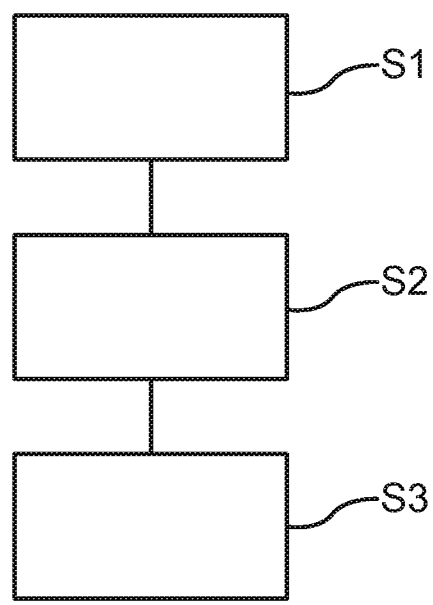
FIG. 4 shows a schematic illustration of one embodiment of the method according to the invention.

FIG. 4 shows a schematic illustration of one preferred embodiment of the method according to the invention with reference to the components described in conjunction with FIGS. 1 to 3. In a first step S1, a battery housing 16, a temperature control unit 18 thermally contacted with the battery housing 16, and a plurality of battery modules 12 each comprising multiple battery cells 14 are provided. In a second step S2, a thermally conductive cavity filling compound 20 is provided. In a third step S3, a respective battery module 12 is inserted into the battery housing 16 along an insertion direction 22. During insertion, i.e., during step S3, the respective battery module 12 and the battery housing 16 are moved in relation to one another in at least one further direction and/or in the insertion direction 22 by a motorized shaker 24 by means of a shaking movement 26. In the course of step S3, the thermally conductive cavity filling compound 20 is distributed in a cavity 38 between the respective battery module 12 and the battery housing 16 by the shaking movement 26.

In one specific embodiment, during the insertion of the respective battery module 12 into the battery housing 16, a translational and/or rotational and/or vertical oscillation (i.e., a shaking movement 26) is exerted using a frequency adapted to media (i.e., to a respective cavity filling compound 20) and/or components (i.e., battery module 12 and battery housing 16). The known pressing of the cavity filling compound 20 (so-called gap filler) is thus combined with the shaking procedure or the shaking movement 26. A shifting procedure occurs in at least the x-y direction during the insertion.

The insertion can be combined with the application of specific application patterns of the cavity filling compound 20 to be applied to a respective battery cell 14, a respective battery module 12, and/or the battery housing 16, for example, in the form of the described strands 34 or blobs 30, 32.

The specific application patterns of cavity filling compound 20 or gap filler enable the installation procedure or the insertion to be optimized with respect to remaining gap height and/or process time and/or material expenditure for the cavity filling compound 20 or the heat conducting medium. Already existing design-related geometries, for example, cell radii of the prismatic cell housing, may be used in the optimized application of the cavity filling compound 20. The relevant surface or surface to be thermally contacted with the temperature control unit 18 (i.e., for example, a flat cell base) can be wetted using very short flow paths.

Overall, the examples show how a method for efficiently assembling a battery using a thermally conductive cavity filling compound can be provided by the invention. A contact pressure force during the insertion can advantageously be reduced in relation to known methods and deformation of the battery housing can thus be prevented.

The invention claimed is:

1. A method for assembling comprising:
a battery having a plurality of battery modules each comprising multiple battery cells, a battery housing at least partially enclosing the battery modules, and a temperature control unit thermally contacted with the battery housing, wherein a thermally conductive cavity filling compound for thermally contacting the battery cells of the plurality of battery modules with the temperature control unit is arranged in a cavity between an outside of a respective battery module inserted into the battery housing and an inside of the battery housing facing toward the outside of the respective battery module,
wherein when the respective battery module is inserted into the battery housing along an insertion direction, the respective battery module and the battery housing are moved in relation to one another in at least one further direction and/or in the insertion direction by a motorized shaker by means of a shaking movement and the thermally conductive cavity filling compound is distributed in the cavity by the shaking movement, wherein during the insertion, the respective battery module is at least temporarily moved by means of the shaking movement in relation to the battery housing and the battery housing is held stationary.

2. The method as claimed in claim 1, wherein the battery housing is arranged on a shaking table and is moved by means of the shaking movement during the insertion, wherein the respective battery module is only moved along the insertion direction for the insertion.

3. The method as claimed in claim 1, wherein a thixotropic fluid is used as the cavity filling compound.

4. The method as claimed in claim 1, wherein the respective battery module is immersed in the cavity filling compound by a predominant part.

5. The method as claimed in claim 1, wherein, before the insertion, the cavity filling compound is arranged as at least one strand and/or at least one blob on at least one of the battery cells of the respective battery module and/or on the inside of the battery housing facing toward the outside of the respective battery module, wherein each strand and/or blob is flattened and/or expanded and/or smeared by the shaking movement.

6. The method as claimed in claim 2, wherein a thixotropic fluid is used as the cavity filling compound.

7. The method as claimed in claim 2, wherein the respective battery module is immersed in the cavity filling compound by a predominant part.

8. The method as claimed in claim 3, wherein the respective battery module is immersed in the cavity filling compound by a predominant part.

9. The method as claimed in claim 2, wherein, before the insertion, the cavity filling compound is arranged as at least one strand and/or at least one blob on at least one of the battery cells of the respective battery module and/or on the inside of the battery housing facing toward the outside of the respective battery module, wherein each strand and/or blob is flattened and/or expanded and/or smeared by the shaking movement.

10. The method as claimed in claim 3, wherein, before the insertion, the cavity filling compound is arranged as at least one strand and/or at least one blob on at least one of the battery cells of the respective battery module and/or on the inside of the battery housing facing toward the outside of the respective battery module, wherein each strand and/or blob is flattened and/or expanded and/or smeared by the shaking movement.

11. The method as claimed in claim 4, wherein, before the insertion, the cavity filling compound is arranged as at least one strand and/or at least one blob on at least one of the battery cells of the respective battery module and/or on the inside of the battery housing facing toward the outside of the respective battery module, wherein each strand and/or blob is flattened and/or expanded and/or smeared by the shaking movement.

* * * * *